Figure 1:
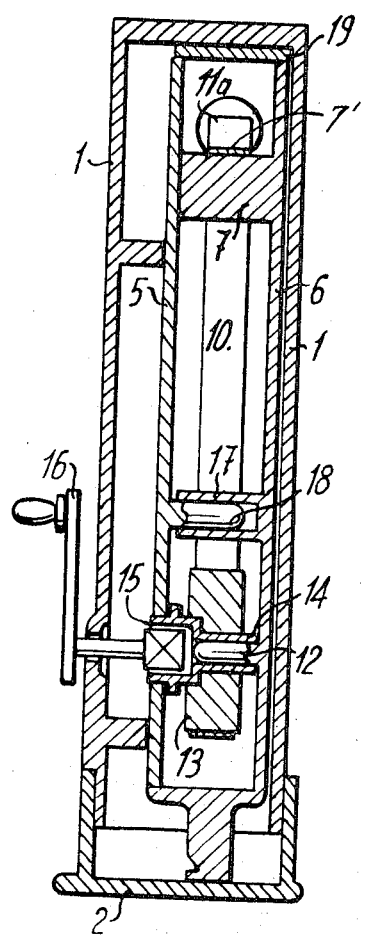

United States Patent [19]
Potter

[11] 3,840,973
[45] Oct. 15, 1974

[54] TRANSPARENCY VIEWING CASSETTE UNIT

[76] Inventor: Peter Rex Potter, 47 bis, route de Florissant, Geneva, Switzerland

[22] Filed: Nov. 15, 1972

[21] Appl. No.: 306,713

[30] Foreign Application Priority Data
Nov. 24, 1971 Switzerland.................. 17116/71

[52] U.S. Cl................ 29/434, 29/446, 352/99, 352/72
[51] Int. Cl. ............................................ G03b 25/00
[58] Field of Search ............... 352/98, 99, 78, 72; 29/434, 446, 450

[56] References Cited
UNITED STATES PATENTS

| | | | |
|---|---|---|---|
| 617,643 | 1/1889 | Davis | 352/99 |
| 636,642 | 11/1899 | Dickson | 352/99 |
| 721,261 | 2/1903 | Warren | 352/99 |
| 1,466,252 | 8/1923 | Shaw | 352/99 |
| 2,084,782 | 6/1937 | Storey et al. | 352/99 |
| 2,197,268 | 4/1960 | Gold | 352/99 |
| 3,045,529 | 7/1962 | Kuehnle | 352/99 X |
| 3,706,439 | 12/1972 | Skinner | 352/129 |

FOREIGN PATENTS OR APPLICATIONS

| | | | |
|---|---|---|---|
| 1,156,385 | 6/1969 | Great Britain | 352/99 |
| 526,397 | 10/1921 | France | 352/99 |
| 611,964 | 10/1926 | France | 352/99 |
| 21,540 | 10/1904 | Great Britain | 352/99 |

*Primary Examiner*—Charles W. Lanham
*Assistant Examiner*—Dan C. Crane
*Attorney, Agent, or Firm*—Emory L. Groff; Groff, Jr. Emory L.

[57] ABSTRACT

A cassette unit for viewing transparencies comprises a casing containing a flexible endless band carrying on its outer face a plurality of equispaced image-carrying transparencies disposed perpendicular to the plane of the band and to the general longitudinal direction of the band. The band passes about a crank-actuated driving wheel and a guide, about which guide the transparencies can be successively placed one at a time between a pair of viewing apertures in the casing, and out of alignment with the other transparencies. The cassette unit can be used either on its own or in conjunction with a viewer apparatus, for viewing the images cinematographically or one by one.

2 Claims, 2 Drawing Figures

TRANSPARENCY VIEWING CASSETTE UNIT

The invention relates to units for viewing image-carrying transparencies, an enclosed casing containing a plurality of such transparencies being termed a transparency cassette and being used, either on its own or in conjunction with a separage apparatus, for viewing or projecting the images on the transparencies, for example, in the mmanner of a cinematograph.

According to the invention, a transparency cassette comprises a casing containing a two-faced flexible band carrying on one face thereof a plurality of spaced-apart image-carrying transparencies. Each transparency is in a plane perpendicular to the plane of the band in the vicinity of the transparency and perpendicular to the general longitudinal direction of the band. The casing includes a wheel drivably engaging the other face of the band and a pair of guide surfaces about which said other face of the band passes, the band preferably being endless with said other face disposed innermost. Said guide surfaces are parallel to the axis of the wheel and are spaced apart by an amount less than the distance between three successive transparencies along said band, whereby said transparencies can be successively placed one at a time on a portion of the band between said guide surfaces with an axis disposed perpendicular to said one transparency disposed in a given orientation out of alignment with the other transparencies on the band. The casing also includes two light-transmitting openings in two opposite faces thereof, said two openings each being located at least substantially along the central perpendicular axis of a transparency carried by a portion of the band between said two guide surfaces.

The cassette may be used in combination with an apparatus for viewing images carried by said transparencies, said apparatus including a housing removably receiving said cassette, crank means for driving said wheel of said cassette, and eye-piece means in alignment with said openings for viewing images carried by said transparencies.

Figure 2:
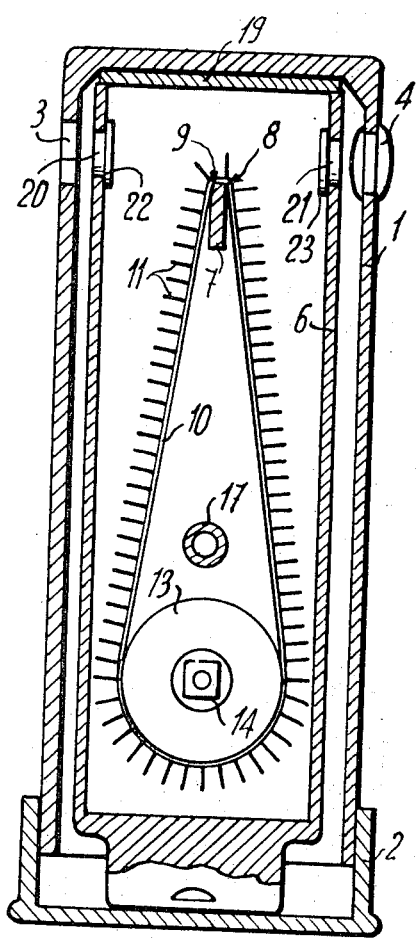

An embodiment of the invention will now be described, by way of example, with reference to the accompanying schematic drawings, in which:

FIGS. 1 and 2 are respectively transversal and longitudinal cross-sections through an apparatus including a transparency cassette according to the invention.

The apparatus shown comprises a parallelepipedic hollow housing 1 closed by a removable bottom cover 2. Housing 1 includes two facing openings on two of its opposed faces, one opening being closed by a transparent plate 3, for example, in organic glass, whilst the other opening carries an eye-piece 4 including at least one lens.

The housing 1 is adapted to contain a mini-cassette including a casing made of a main part 6 and a lid 5. Part 6 has an inner projection or bar 7 of substantially rectangular cross-section, including two edges 7 and 9 which form bearing and guide surfaces for a flexible endless band 10 carrying a plurality of equally spaced apart image-carrying generally rectangular transparencies 11 each fixed by one straight edge onto the outer face of band 10 A top surface 7' is formed on the bar 7 between the guide surfaces 8 and 9.

Part 6 of the casing also includes a boss 12 which forms a pivot for a driving wheel 13 carried by a hub 14 including a square-sectioned recess 15 in its outer end. This recess 15, accessible through an opening in lid 5, enables wheel 13 to be driven by means of a crank 16 mounted in a wall of housing 1 in a manner to permit not only rotation but also an axial movement for introduction and removal of a square inner end of the crank shaft into and out of recess 15.

The inner face of part 6 of the casing also has a tubular protuberance 17 in which a boss 18 of the mini-cassette lid 5 firmly engages to hold the lid 5 and part 6 together. Boss 18 may, for example, be force-fitted in the tubular protuberance 17 or could be glued therein.

The upper face of the casing formed by lid 5 and part 6 is closed by a sealed cover 19.

The distance between the two guide surfaces formed by edges 8 and 9 is slightly greater, by about 10 percent, than the distance between two consecutive transparencies 11 on band 10. Consequently, the transparencies 11 can be placed one at a time along a part of the band 10 between the edges 8 and 9, such a transparency indicated by reference 11a in FIG. 1 being located along the optical axis of eye-piece 4. The image of a transparency located at 11a is visible, since the mini-cassette casing has two light-transmitting openings, covered by windows 22, 23, located along a perpendicular axis passing through the center of a transparency at 11a. Windows 22, 23 therefore allow light to pass into the cassette for observation of the images on the transparencies 11 at position 11a by means of eye-piece 4, whilst preventing the ingress of dust into the casing.

A process for manufacturing the cassette according to the invention comprises the following steps: forming a part of the min-cassette casing including said guide casing including said guide surfaces and a bearing for the driving wheel, placing the driving wheel on the bearing, placing a flexible band without transparencies over the driving wheel and the guide surfaces, and fixing on the band after its positioning over the wheel and guide surfaces a plurality of image-carrying transparencies by their edges.

The part 6 of the casing is thus firstly provided, for example by injection molding synthetic plastic material, after which the driving wheel 13 is placed on the boss 12. Then a flexible endless band 10 without transparencies is placed about wheel 13 and about the projection 7, over its edges 8 and 9. The assembly is then placed on a machine, not shown, which enables wheel 13 to be turned step-by-step, so that for each step the periphery of wheel 13 and band 10 move by a distance corresponding to the desired separation between successive transparencies 11 on band 10. Transparencies 11 are successively provided facing and perpendicular to a plane face of the band between the edges 8 and 9, in synchronization with the intermittent movement of band 10. Each time that the band 10 stops, a transparency 11 is applied by one of its edges to the band 10 between edges 8 and 9, and is fixed to the band 10 by a sticking or by any other means, for example, by ultrasonic welding. The fixing of the transparencies on the support band can be advantageously achieved by welding by means of a Laser beam. The Laser beam would be directed through the support band onto the lowr edge or bottom surface of each transparency. Preferably, the support band is stretched against a piece provided with an aperture for the Laser beam. It is clear that in this manner, the transparencies 11 can be applied to the band 10 in a very precise manner, which is necessary to ensure good conditions for observing the images.

After applying all of the transparencies 11 onto the band 10, the case is closed by assembling the lid 5 and part 6 and sealing the cover 19. Of course, lid 5 and part 6 could be assembled before applying the transparencies 11 onto band 10, since this operation can be carried out through the open face which is subsequently closed by cover 19. In any event, after applying the transparencies 11, the band 10 does not need to be handled so that any risk of deterioration of the band 10 and/or of the transparencies 11 is avoided. As the transparencies never come into contact with solid parts of the apparatus, any damage or scratches of the transparencies is avoided and therefore they will last indefinitely long, regardless the actual duration of the operation of the apparatus.

It is thus possible to offer for sale complete cinematographic "films," for example, cartoon "films," mounted in a cassette protected from the ingress of dust. The user can purchase several cassettes with different contents and which can be individually placed in the housing 1 when it is desired to view the "film," which is achieved by looking through eye-piece 4 whilst turning handle 16.

Of course, the apparatus could alternatively be designed as a projector, the housing 1 being replaced by an assembly including means for automatically driving the wheel 13 and band 10, and means for projecting a beam of light through a transparency 11 at position 11a, the illuminated image passing through an objective and being projected onto a screen.

Of course, many variations may be made. For example, the mini-cassette could itself include a crank for driving the wheel 13 and band 10, as well as an eye-piece, for example, in synthetic resin, in a manner to form a complete cinematographic or still transparency viewer unit. In a particularly improved version, the apparatus could include a magnetic head adapted to co-operate with a magnetic track carried by the band 10, to reproduce a sound track. When used as a cinematographic or transparency viewer, the housing 1 (or the cassette) could be provided with an electric light source, for example a battery operated bulb. Also, for viewing the transparencies 11 one by one, the crank 16 could be replaced by, or could incorporate, means for advancing the band 10 step-by-step.

When the transparencies are obtained from a cinematographic film, for example of the Super-8 size, both side bands, which are provided for the perforations and for applying a magnetic track, may be cut off, so that the width of the band is only 80 percent of the width of the corresponding Super-8 film. As the number of images for a definite length of the band 10 is at least three times the number of images of a conventional Super-8 film, a very large number of images is obtained on a substantially short length of the band 10.

I claim:

1. A process for manufacturing a transparency cassette comprising the steps of: providing a mini-cassette with a spaced apart outwardly projecting bar and drive wheel, said bar having a top surface bounded by a pair of guide surfaces, providing a pair of light-transmitting openings in opposite sides of said mini-cassette having an aligned optical axis passing above said bar top surface, stretching a flexible band without transparencies about said drive wheel and over said bar top surface and guide surfaces, affixing on the outer face of said band a plurality of image-carrying transparencies having at least one straight edge by attaching said straight edge to said band outer face with the plane of each said transparency disposed perpendicular to said band outer face whereby, when said transparency is adjacent said bar top surface its image is centrally aligned with and perpendicular to said optical axis.

2. A process according to claim 1 and further comprising the step of: fixing successive ones of said transparencies onto said outer face of said band with a longitudinal spacing between any two successive ones of said transparencies less than the distance between said guide surfaces.

* * * * *